UNITED STATES PATENT OFFICE.

HERMANN A. SEEGALL, OF BERLIN, GERMANY.

PROCESS OF ELECTROLYTICALLY OBTAINING COPPER.

SPECIFICATION forming part of Letters Patent No. 415,738, dated November 26, 1889.

Application filed March 20, 1889. Serial No. 304,059. (No specimens.)

*To all whom it may concern:*

Be it known that I, HERMANN ALBERT SEEGALL, a subject of the King of Prussia, German Emperor, and a resident of 129 Invaliden Strasse, Berlin, Germany, have invented certain new and useful Improvements in the Electrolytic Process of Obtaining Copper, of which the following is an accurate description.

My discovery consists of a combined lixiviation and electrolytic process of obtaining copper from materials containing the same.

The principal features of the discovery consist in subjecting the undissolved cuprous chloride obtained in the known manner by reaction and lixiviation of the ores with ferric chloride to a second lixiviation with halogen salts or halogen acids, or any of the well-known means of dissolving cuprous chloride, (sodium hyposulphite,) and thus obtaining cuprous chloride in solution. This cuprous chloride is treated electrolytically in the presence of ferrous chloride and copper, and ferric chloride is obtained, and at the same time any injurious development of the chlorine is avoided.

I am well aware that materials containing copper have been subjected to a lixiviation process with ferric chloride with a view to changing them prior to my discovery; but in this treatment, in view of afterward obtaining copper electrolytically, the main idea was to gain cupric chloride, and the process was always so conducted that if any cuprous chloride was formed it was always converted into cupro-chloride. With a view to obtaining cement copper the lixiviation was conducted in such a manner that formed cuprous chloride was also dissolved; but at the precipitation the cuprous chloride was not separated, nor was it separately subjected to a second lixiviation.

I conduct my lixiviation with the aid of two different lixivia and in two separate operations. In the first operation I obtain undissolved cuprous chloride by reaction with ferric chloride, and in the second I dissolve the separated undissolved chemically-unaltered cuprous chloride. This conversion and lixiviation of the undissolved chemically-unaltered cuprous chloride obtained by reaction of ferri-halogens into cuprous-chloride solution is, in the combined lixiviation and electrolytic process constituting the present discovery, entirely new. The electrolytic part of the process is also new—that is, the electrolytical treatment of the cuprous chloride in the presence of ferrous chloride either dissolved together or separated by a diaphragm.

It has not yet been attempted to treat cuprous chloride electrolytically in the presence of ferrous chloride, in spite of the fact that by this means the greatest possible extraction of copper is attained by the least amount of electrical power, and in spite of the fact that, besides this, the process has another great advantage, which is the easy elimination of all impurities of the copper through other metals (arsenic) in the lixiviation process.

This new process consists in lixiviating the material containing the copper with ferric chloride ($Fe_2Cl_6$) so long until the ferric chloride ($Fe_2Cl_6$) is converted into ferrous chloride ($FeCl_2$) and undissolved cuprous chloride ($Cu_2Cl_2$) has been produced. This undissolved cuprous chloride ($Cu_2Cl_2$) is then separated by filtration from the lixivium which retains the other metals and impurities, (arsenic.) The undissolved cuprous chloride separated from the lixivium is then subjected to a second lixiviation with a halogen acid or halogen salt, or with another agent dissolving cuprous chloride, ($Cu_2Cl_2$,) adding, eventually, a combination of iron with chlorine. Under the term "combination of iron with chlorine" I understand either a ferrous chloride ($FeCl_2$) or a ferric chloride with a reducing agent.

In lixiviating without the addition of a combination of iron with chlorine a cuprous-chloride solution ($Cu_2Cl_2$) will be obtained, which is treated in the electrolytic process in the presence of ferrous chloride, (that is to say, either dissolved together or separated from each other by a diaphragm,) whereby a very pure copper is obtained.

The practical working of the process is described in the following examples:

Iª. If it be desired to work a substance containing copper and zinc together, either as metals or as sulphides, the substance must be ground or otherwise broken up into sufficiently small pieces and lixiviated in troughs with a moderately-concentrated solution of sesquichloride of iron slightly acidulated by hydrochloric acid until the whole sesquichloride of iron with the exception of a very little has been resolved into ferrous chloride. The resulting solution contains all the ferrous chloride $(FeCl_2)$ and zinc chloride $(ZnCl_2)$ dissolved, while the principal mass of the cuprous chloride, $(Cu_2Cl_2,)$ together with a little metallic copper deposited in a spongy form, (in consequence of the presence of other metals,) the oxychlorides of iron,

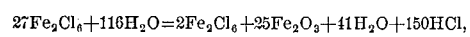

formed from the same cause, and possibly a little sulphur, remain suspended therein. This solution is passed through a filter, where the above-named suspended (that is to say, undissolved) substances remain back, and then into the electrolytic baths, where the zinc is precipitated.

I$^b$. The cuprous chloride $(Cu_2Cl_2)$ which remains in the filter is then put into the troughs, together with metallic copper, (copper cuttings or filings,) and so long lixiviated with a concentrated solution of sesquichloride of iron slightly acidulated with hydrochloric acid until only a very little of the sesquichloride of iron remains. This solution must contain a sufficient quantity of a salt—such as chloride of calcium or chloride of sodium—in order to hold the cuprous chloride in solution. This lixivium is then passed through a filter in order to eliminate the suspended sulphur, and then into the electrolytic baths to obtain the copper.

II$^a$. If it be desired to work a material containing copper and tin as alloys—for instance, metallic cuttings—the same must be lixiviated with a moderately concentrated solution of sesquichloride of iron slightly acidulated with hydrochloric acid until all or nearly all of the sesquichloride of iron has been resolved into protochloride of iron. The resulting combination contains all the protochloride of iron and of tin in solution, while the principal mass of the cuprous chloride, together with a little metallic copper deposited in a spongy form, as well as some oxychlorides of iron, (as mentioned under I$^a$,) remain suspended. The solution is now passed through a filter, where everything which is not dissolved remains back, and then into the electrolytic baths, where the tin is obtained.

II$^b$. The cuprous chloride which has remained in the filter is treated in the manner described in I$^b$, and is then placed in the electrolytic baths for obtaining the copper.

The course of the above-named lixivia is the following: from the cathode-cell of the first bath to that of the second, from there to that of the third, and so on; from the cathode-cell of the last bath into the anode-cell of the first, and from this to that of the second, and so on; then from the anode-cell of the last bath into the troughs again for new lixiviation.

I do not confine myself to the course of the lixivia in the electric baths mentioned above. This course may be chosen as considered compatible with the practice. The residuum in the troughs can be worked on precious metals.

In the following claims I understand under the term "materials containing copper" not only those materials containing copper as a metal, but also as an alloy with other metals and with metalloids, and in particular ores, smelting products, and metal cuttings.

Having thus fully described the nature of my said invention and in what manner the same is to be performed, what I desire to secure by Letters Patent of the United States is—

1. The process of obtaining copper from materials containing the same, consisting in, first, lixiviating copper-containing material with ferric chloride; secondly, separating the undissolved cuprous chloride from the solution; thirdly, dissolving the undissolved cuprous chloride, and then treating electrolytically the cuprous-chloride solution, for the purpose as described.

2. The process of obtaining copper from materials containing the same, consisting in, first, lixiviating copper-containing material with ferric chloride; secondly, separating the undissolved cuprous chloride from the solution; thirdly, dissolving the undissolved cuprous chloride, and then treating electrolytically the cuprous-chloride solution in the presence of ferrous chloride, for the purpose as described.

In witness whereof I have hereunto set my hand in presence of two witnesses.

HERMANN A. SEEGALL.

Witnesses:
 B. ROI,
 THEODOR HEESE.

It is hereby certified that in Letters Patent No. 415,738, granted November 26, 1889, upon the application of Hermann A. Seegall, of Berlin, Germany, for an improvement in "Process of Electrolytically Obtaining Copper," errors appear in the printed specification requiring the following corrections, viz: In lines 21, 22, and 23, page 1, the clause "in the presence of ferrous chloride and copper, and ferric chloride is obtained," should read *in the presence of ferrous chloride, and copper and ferric chloride are obtained*, and in line 35, same page, the word "cupro-chloride" should read *cupric chloride;* and that the Letters Patent should be read with these corrections therein that the same may conform to the record of the case in Patent Office.

Signed, countersigned, and sealed this 11th day of March, A. D. 1890.

[SEAL.]

CYRUS BUSSEY,
*Assistant Secretary of the Interior.*

Countersigned:
ROBERT J. FISHER,
*Acting Commissioner of Patents.*